United States Patent [19]

Erickson, Jr.

[11] Patent Number: 4,693,734

[45] Date of Patent: Sep. 15, 1987

[54] VACUUM CLEANER CONSTRUCTION

[75] Inventor: Roy O. Erickson, Jr., Cadillac, Mich.

[73] Assignee: Rexair, Inc., Troy, Mich.

[21] Appl. No.: 864,820

[22] Filed: May 19, 1986

Related U.S. Application Data

[63] Continuation-in-part of Ser. No. 782,509, Oct. 1, 1985, Pat. No. 4,640,697.

[51] Int. Cl.⁴ .............................................. B01D 47/02
[52] U.S. Cl. ........................................ 55/248; 55/276; 55/472; 15/353
[58] Field of Search ................. 55/276, 248, 470, 472; 15/353

[56]  References Cited

U.S. PATENT DOCUMENTS

| | | | |
|---|---|---|---|
| 2,221,572 | 11/1940 | Brock et al. | 55/248 |
| 2,534,808 | 12/1950 | Bevington, Jr. et al. | 55/216 |
| 2,648,396 | 8/1953 | Kirby | 55/400 |
| 2,886,127 | 5/1959 | Brock | 55/248 |
| 2,945,553 | 7/1960 | Brock | 55/248 |
| 2,954,095 | 9/1960 | Brock | 55/255 |
| 4,138,761 | 2/1979 | Nauta | 15/353 |
| 4,226,575 | 10/1980 | Hyatt et al. | 417/423 A |
| 4,547,206 | 10/1985 | Sovis et al. | 15/353 |

Primary Examiner—Bernard Nozick
Attorney, Agent, or Firm—Harness, Dickey & Pierce

[57]  ABSTRACT

The present invention discloses a liquid bath vacuum cleaner having a cooling air stream separated from its cleaning air stream to improve the cooling efficiency of the vacuum cleaner. The separation of the air streams accomplished by a construction comprising a pan assembly, a baffle member detachably connected to the pan assembly, a main housing detachably connected to the baffle member, a cap assembly connected to the housing, a motor assembly mounted within the cap assembly including a drive motor, a separator for drawing cleaning air into the vacuum cleaner, and a sealing mechanism to form a cleaning air cavity or pathway through the vacuum cleaner and a separate cooling air cavity for cooling air for the drive motor.

8 Claims, 2 Drawing Figures

VACUUM CLEANER CONSTRUCTION

CROSS-REFERENCE TO RELATED APPLICATION

The present application is a continuation-in-part application of U.S. Ser. No. 782,509, filed Oct. 1, 1985 now U.S. Pat. No. 4,640,697.

BACKGROUND AND SUMMARY OF THE INVENTION

The present invention relates to vacuum cleaners, more particularly to liquid bath vacuum cleaners. In the past, liquid bath vacuum cleaners have mixed motor cooling air and cleaning air during the cleaning process. Examples of prior art are U.S. Pat. Nos. 2,886,127, 2,945,553, and 2,954,095, illustrating different embodiments of liquid bath vacuum cleaners. All embodiments show the mixing of cooling air and cleaning air during the cleaning process. Applicant has determined that the cooling of the drive motor from the vacuum cleaner can be improved with separation of the cooling air from the cleaning air. Thus, a need in the field has existed to separate the cleaning air stream from the motor cooling air stream to alleviate the mixing of these air streams and improve the cooling of the drive motor along with increasing the life of the motor by this increased cooling efficiency.

Accordingly, it is a primary object of the present invention to separate the cleaning air from the cooling motor air to improve the cooling efficiency of the vacuum cleaner cooling the drive motor. Another object of the present invention is improved sealing between the cleaning air and cooling air portions of the vacuum cleaner to maintain driven cooling air.

To achieve the foregoing objects, the present invention provides a liquid bath vacuum cleaner which generally comprises a water pan, a main housing assembly, cap assembly, motor assembly, a fan assembly, means for separating the suction air from the cooling air, and a separator. The water pan assembly has a socket, acting as a suction end, for connection to a conventional cleaning hose. Cleaning air including dirt and dust particles enters the water pan assembly which contains a predetermined amount of liquid and the dirt and dust particles are separated from the air. The dust and dirt particles remain in the liquid and the cleansed air passed through the separator, through the fan assembly, and into the main housing cavity, and exits into the ambient air through a plurality of apertures in the main housing assembly wall.

In an alternate embodiment a baffle plate may be positioned between the water pan assembly and the main housing assembly. The baffle plate encloses the main housing assembly from the pan assembly thus preventing dust particles from collecting on the pan assembly. Also, the baffle plate adds support to the main housing assembly along with providing improved noise dampening characteristics.

The separate motor cooling air is drawn into the cap assembly by the motor fan. The cooling air circulates around the motor assembly to cool the motor assembly, passes through a gap in the inner canister into the cap assembly cavity, and exits into the ambient air through a plurality of apertures in the cap assembly wall. Thus, the cooling air stream and cleaning air stream are separated to eliminate the possibility of combining contaminants with the air cooling the motor.

Additional advantages and features of the present invention will be apparent from the subsequent description and the appended claims taken in conjunction with the accompanying drawings.

DETAILED DESCRIPTION OF THE PREFERRED EMBODIMENT

Figure 1:
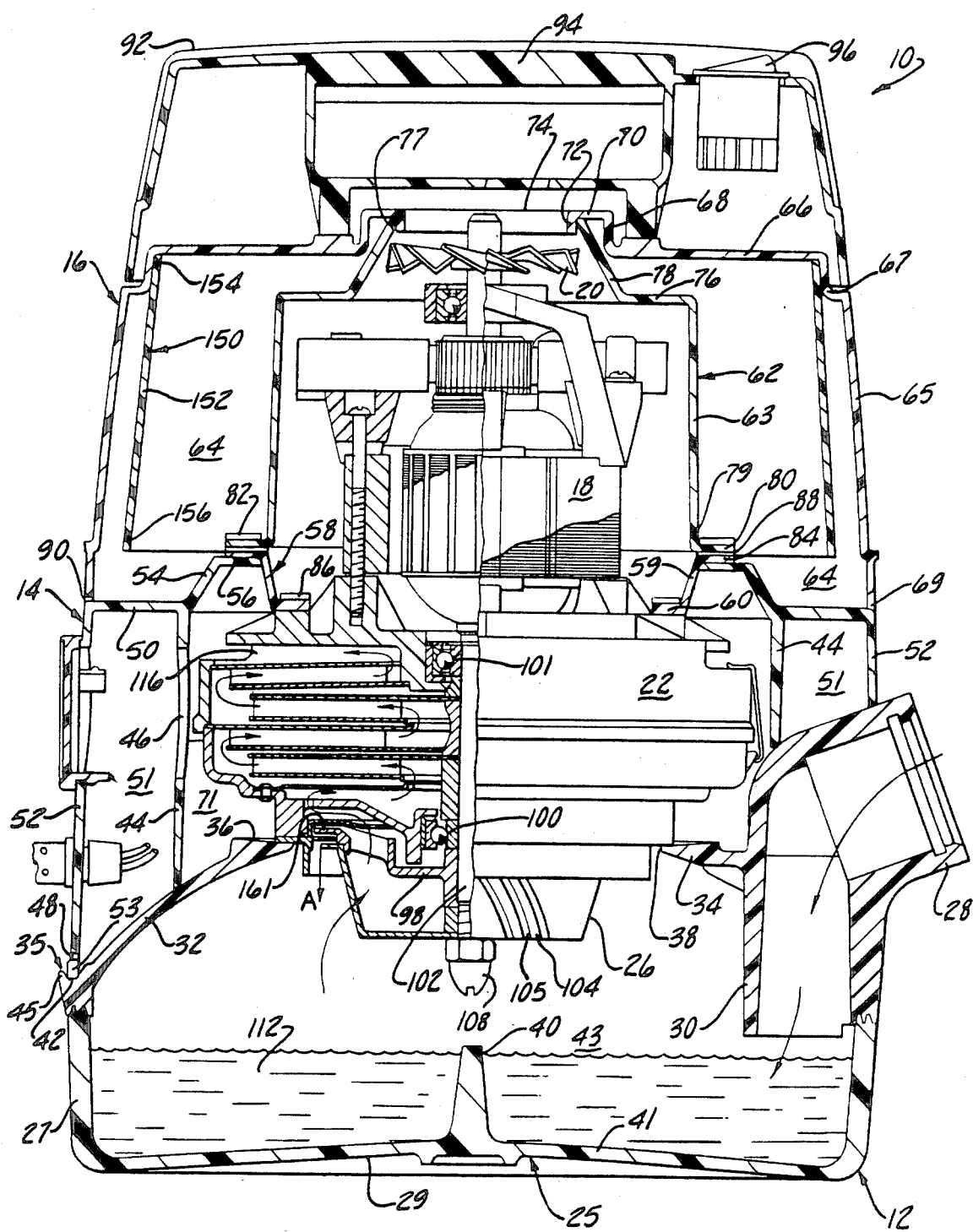
FIG. 1 is a side elevational view partially in a cross-section of the present invention.

Referring to FIG. 1, a partial cross-sectional view of a vacuum cleaner 10 according to the present invention is shown. The vacuum cleaner 10 generally comprises a water pan assembly 12, a main housing assembly 14, a cap assembly 16, a motor assembly 18 and fan 20, a fan and stage housing assembly 22, a motor gasket 230 and a separator 26. The motor assembly 18 and fan 20 are mounted within the cap assembly 16, the fan and stage housing assembly 22 is mounted within the main housing assembly 14, and the separator 26 is mounted adjacent to the fan and stage housing assembly 22 and disposed within the water pan assembly 12, when the water pan assembly is operably associated with the main housing assembly 14. The water pan assembly 12 is detachably connected to the main housing assembly 14 by conventional means, such as the latch mechanism, (not shown), comprising a plurality of latches around the circumference of the main housing assembly 14. The main housing assembly 14 is detachably connected to the cap assembly 16 by suitable fasteners (not shown).

The water pan assembly 12 has an overall cylindrical, inverted bowl shape design. A circular plate portion forms the base 25 of the pan assembly 12. The base 25 has a concave outer surface 29 and a protrusion 40 at the apex of its inner surface 41. The protrusion 40, acting as a liquid level indicator, extends from the base 25 a desired length. A continuous outer wall 27 forms the cylindrical portion of the pan assembly 12. A second wall portion 32, extending radially inward from the outer wall 27, forms the inverted bowl portion of the pan assembly 12.

A flange 34, positioned on the depending end of the wall portion 32, forms a circular opening 38 in the pan assembly 12. The flange 34 has a flat planar surface 36 for mounting the motor gasket 24 on the pan assembly 12. The opening 38 enables passage of the separator 26 into the pan assembly cavity 43.

A securing means 35 is formed at the intersection of the outer wall 27 and the second wall portion 32. The securing means 35 positions the main housing assembly 14 upon the pan assembly 12. The securing means 35 comprises a ledge 42 and retaining ring 45. The ledge 42 is on a line substantially perpendicular to the outer wall 27. The width of the ledge 42 is sufficient to nest the main housing assembly 14 upon the outer wall 27. The retaining ring 45 is a continuous projection adjacent to the ledge 42 for trapping the main housing outer wall 52 in the ledge 42.

A socket 28 is formed in the outer wall 27 of the water pan assembly 12. The socket 28 provides a suction inlet for drawing cleaning air into the pan assembly 12. The socket 28 has an overall cylindrical shape for easy adaption of a conventional hose to the pan assembly 12. A throat portion 30 is adjacent to the socket 28. The throat portion 30 acts as a backstop for directing the cleaning air towards the base 25 of the pan assembly 12. Thus, a cleaning air enters into the vacuum cleaner 10, at the socket 28, it is directed by the throat 30 towards the base 25 of the pan assembly 12.

The main housing assembly 14 has an overall concentric cylinder design. A continuous outer wall 52 forms the outer concentric cylinder of the main housing 14. A second inner wall 44 forms the inner concentric cylinder of the main housing 14. A radially inward flange 50 connects the outer wall 52 with the inner wall 44 at the top of the main housing assembly 14. The free depending end 53 of the outer wall 52 nests in the ledge 42 of the pan assembly 12. The inner wall 44, being sufficiently shorter than the outer wall 52, nests upon the outer surface of the inverted wall portion 32 of the pan assembly 12. A cutout portion enables the inner wall 42 to be in contact with the outer surface of the socket 28 and throat 30 portions of the pan assembly 12.

The inner wall 44 surrounds the fan assembly 22. An aperture 46, in the inner wall 44, provides a passage for cleaning air passing out of the fan assembly 22 into the main housing assembly cavity 51. The cleaning air then exits the cavity 51 through a plurality of slits 48, in the outer wall 52, into the ambient air.

The radially inward flange 50 has a desired width forming a cavity 51 between the outer and inner walls of the main housing 14. An annular flange 54 extends from the radial flange 50 towards the cap assembly 18. A second radially inward flange 56 extends from the annular flange 54. The second radial flange 56 has a flat surface for mounting a support ring 58 to the main housing assembly 14.

The cap assembly 16 has an overall cylindrical design. A continuous outer wall 65 forms the outer casing of the cylindrical cap assembly. The outer wall 65 has its free depending end 69 in a nesting relationship with the main housing assembly 14. The top of the cap assembly 16 is defined by an annular flange 67 extending from the outer wall 65, a radially inward flange 60 extending from the annular flange 67, a second annular flange 68 extending from the radial flange 60, a second radially inward flange 70 extending from the second annular flange 68, and a lip 72 depending from the second radially inward flange 70. The second radial flange 70 and lip 72 forms an opening 74 in the cap assembly 16. The opening 74 provides a passageway for cooling air into the cap assembly.

An inner canister 62, having an overall cylindrical shape, surrounds the motor assembly 18 and is mounted within the cap assembly 16. A continuous wall 63 forms the cylindrical portion of the inner canister 62. A radially outward flange 80 extends from the wall's free depending end 79. The flange 80 nests upon a mounting support ring 58 and the flange 56 for securing the inner canister to the main housing assembly 14. A radially inward flange 76 extends from the outer end of the wall 63. An annular flange 78 extends from the radial flange 76 having its extended end 77 in a nesting relationship with the radial flange 70 and lip 72.

A cavity 64 is formed between the cap assembly 16 and inner canister 62. The cavity 64 may be filled with an insulating material to enhance the baffling effects of the inner canister 62 further eliminating motor noise.

The support ring 58 has an annular wall 59, a radially inward flange 60, and a radially outward flange 84. The annular wall separates the main assembly inner cavity 71 from the inner canister cavity 61. The radially inward flange 60 acts as a mounting surface for securing the fan assembly 22 to the support ring 58. A clamp ring 86 is positioned on the interior surface of the flange 60 for enabling the securing of the support ring 58 to the fan assembly 22 by conventional means. The radially outward flange 84 acts as a mounting surface for securing the support ring to the main housing assembly 14 and inner canister 62. The flange 84 is sandwiched between the flanges 80 and 56. A clamp ring 82 is positioned on the exterior surface of the flange 80 for enabling the securing of the inner canister 62 and support ring 58 to the main housing assembly 14 by conventional means.

A gap 88 is formed between the flange 80 and the support ring flange 84 for providing a passageway for the cooling air to pass from the inner canister into the cavity 64. The cooling air then exits the cavity 64, through a plurality of slits 90, in the cap assembly, to the ambient air.

The cap cover assembly 92 has an overall cylindrical design and is secured to the cap assembly 16 by conventional means. The cap cover assembly 92 provides a handle 94 for carrying the vacuum cleaner 10. A switch 96 is mounted on the cap cover assembly 92 for activation of the vacuum cleaner 10.

FIG. 1 illustrates a cross-section of the fan and stage housing and motor assemblies 22 and 18. The detailed description of the fan and motor assemblies are described in Applicant's co-pending application entitled "Improved Air Blower Assembly for Vacuum Cleaners", filed in the U.S. Patent Office on the same day as this application and herein incorporated by reference. The fan and stage housing assembly 22 is housed in the inner wall 44 of the main housing assembly 14. The fan and stage housing assembly 22 is supported on the pan assembly 12 by a motor gasket. The fan and stage housing assembly 22 has circular disc design, such that when the fan and stage housing assembly 22 is mounted to the support ring flange 60, the fan and stage housing assembly 22 acts as a sealing means between the main housing assembly 14 and the cap assembly 16.

A spider 98, mounted on a shaft 102 adjacent to the fan and stage housing assembly 22, and a sealed bearing 100, mounted on a shaft 102 within the fan and stage housing assembly 22 and adjacent to the spider 98, seal the fan and stage housing assembly 22 from liquid and liquid vapors disposed in the pan assembly 12. The spider 98 and sealed bearing 100 are in close contact with the shaft 102, thus effectuating a watertight seal and positive pressure labyrinth seal between the shaft 102 and the fan and stage housing assembly 22. The fan and stage housing assembly 22 has a second sealed bearing 101 mounted in close contact with the shaft 102, within the fan and stage housing assembly 22, and adjacent to the motor assembly 18, effectuating an airtight seal between the fan and stage housing assembly 22 and motor assembly for further maintaining separation of the cooling air stream from the cleaning air stream.

The positive pressure labyrinth seal is indicated by arrow A. The seal is formed by a plurality of vanes (not shown) cut into or projecting from the extending radial tip 161 of the spider 98. As the spider 98 rotates, the air at the radial tip 161 is forced outwardly, as indicated by arrow A, into a labyrinth groove formed between the fan and stage housing assembly mounting ring and the spider 98 and separator 26. The positive pressure outward air flow is due to the design of the vanes. The air flows outwardly around the periphery of the separator 26 sealing the fan and stage housing assembly 22 from liquid and liquid vapors contained in the pan assembly 12.

The separator 26 has a plurality of blades 104 and inlets 105 on its outer surface for directing the air inside the water pan assembly 12. The separator 26 is mounted on the shaft 102 by an acorn nut 108. The separator 26 depends into the cavity 43 of the water pan assembly 12. As the separator 26 rotates, the dust and dirt particles are collected through the socket 28 and forced into the liquid while the cleaning air is drawn into the fan and stage housing assembly 22 between the blades 104.

The motor gasket has a ring shape, surrounds the flange 34 of the water pan assembly 12, and is of a resilient material, preferably rubber. A lip formed on the gasket protrudes into the water pan assembly 12 for further sealing the fan and stage housing assembly 22 and main housing assembly 14 from the water pan assembly 12.

Cleaning air enters the pan assembly 12 through the socket 28. The throat portion 30 directs the cleaning air into the liquid 112 in the pan assembly 12. The separator 26, already in rotation, directs the dirt and dust particles into the liquid 112 while drawing the cleaning air into the fan and stage housing assembly 22. The cleaning air is drawn into the fan and stage housing assembly 22, passes through a plurality of fan stages 114, and then passes out of the fan and stage housing assembly 22 through a plurality of apertures 116. The cleaning air then enters the main assembly inner cavity 71, passes through the inner wall opening 46 into the main housing assembly cavity 51. The cleaning air then exits the cavity 51 through a plurality of scallops 48, in the main housing 14, into the ambient air.

The cooling air enters the cap assembly through opening 74 into the inner canister 62 to cool the motor assembly 18. The cooling air exits through the gap 88 into the cap assembly cavity 64. The cooling air then exits the cap assembly 16 through a plurality of slits 90 into the ambient air. Thus, the cooling air is separated from the cleaning air in the present invention throughout operation of the vacuum cleaner 10.

Figure 2:
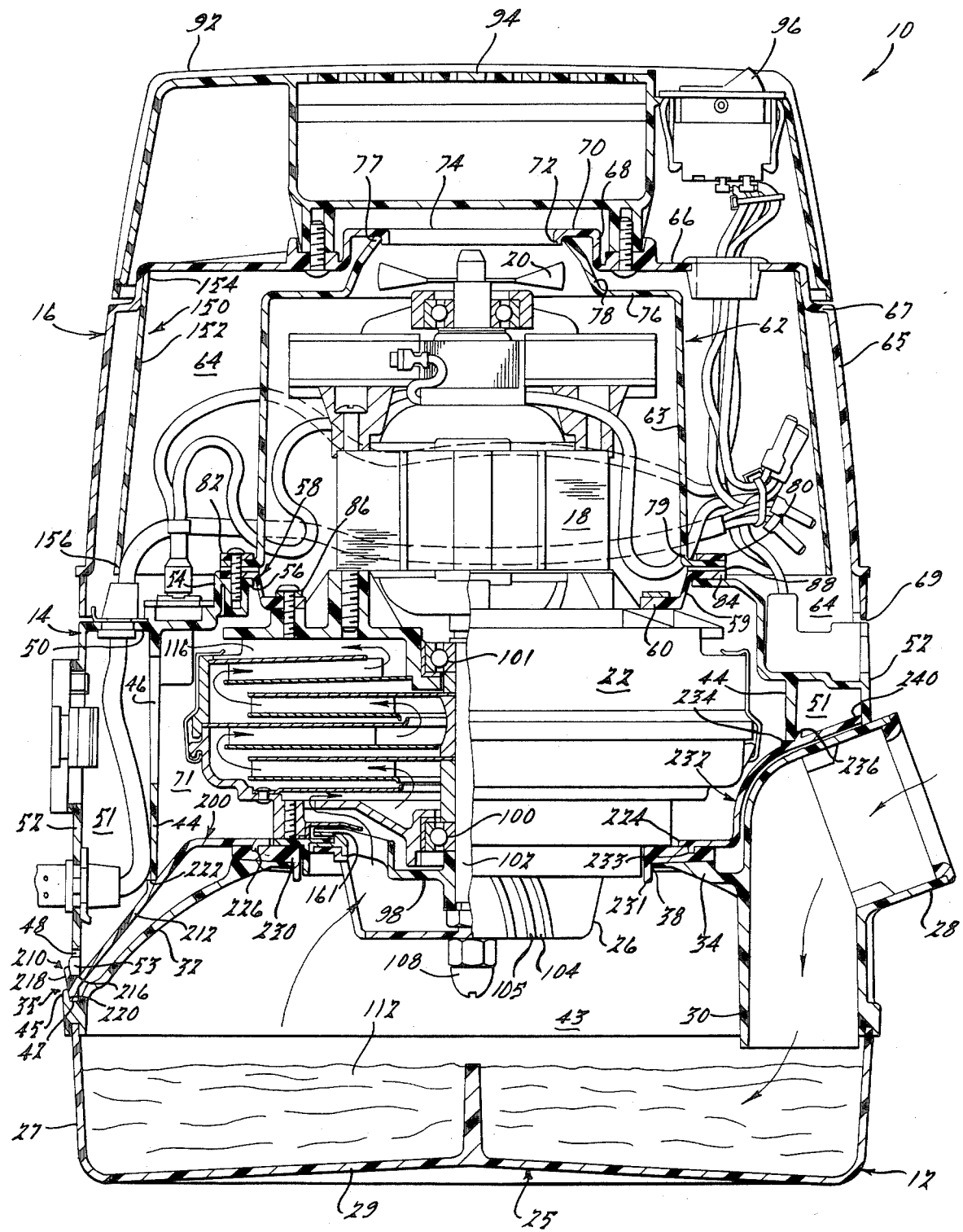
FIG. 2 is a side elevational view partially in a cross-section of an alternative embodiment of the present invention.

FIG. 2 illustrates another embodiment of the present invention in this embodiment. A baffle plate is positioned on the pan assembly for preventing dust particles from collecting on the pan assembly, for providing support to the main housing assembly, and for improving noise dampening. Similar elements will be identified with the same reference numerals.

The baffle plate 200 includes a securing portion 210, a first annular wall portion 212 extending the securing portion 210, and a second wall portion 214 depending from the first annular wall portion 212. The securing portion 210 positions the main housing assembly 14 on to the baffle plate 200, in turn, the baffle plate 200 is positioned on to the pan assembly 12.

The securing portion 210 is comprised of a ledge 216, a retaining ring 218 and a depending wall 220. The ledge 216 is on a line substantially perpendicular to the outer wall 27 of the pan assembly 12. The width of the ledge 216 is sufficient to nest the main housing assembly 14 upon the baffle plate 200. The retaining ring 218 is a continuous projection adjacent to the ledge 216 for trapping the main housing outer wall 52 of the main housing 14 in the ledge 216. The depending wall 220 of the securing portion 210 nests the baffle plate 200 in the ledge 42 of the pan assembly 12.

The annular wall 212 of the baffle plate 200 is continuous with the securing portion 210. The wall 212 is adjacent to and has a similar configuration to the second wall portion 32 of the pan assembly 12. The wall 212 adds support to the main housing assembly 14 and also encloses the housing assembly 14 from the pan assembly 12 so that dust does not settle on the second wall portion 32 of the pan assembly 12. The wall 212 has a flange 222 for enabling the inner wall 44 of the main housing assembly 14 to nest on the flange 222 for further supporting the housing assembly 14.

The second wall portion 214 of the baffle plate 200 is continuous with the first annular wall 212. The second wall portion 214 projects radially inward from the first wall 212 a desired distance forming a circular opening 224 in the baffle plate 200. A peripheral flange 226 on the interior surface of the second wall 224 seats in a peripheral groove in the motor gasket 230. Thus, the baffle plate 200 nests on the motor gasket 230 and pan assembly securing means 35.

The baffle plate 200 has a socket portion 232 for covering the socket 28 of the water pan assembly 12. The socket portion 232 projects from the second wall portion 214 of the baffle plate 200. The socket portion 232 has a flange 234 and a projection 236 for nesting the inner wall 44 of the main housing 14 on the baffle plate 200 over the socket 28 of the water pan assembly 12. The end of the inner wall 44 nests on the flange 234 and abuts the projection 236. The end 240 of the socket portion 232 abuts the outer wall 56 of the main housing 14 around the socket 28. This abutment closes off the main housing cavity 51 from the pan assembly 12 so that dust does not form on the pan assembly 12.

The main housing assembly 14 has an overall concentric cylinder design. A continuous outer wall 52 forms the outer concentric cylinder of the main housing 14. A second inner wall 44 forms the inner concentric cylinder of the main housing 14. A radially inward flange 50 connects the outer wall 52 with the inner wall 44 at the top of the main housing assembly 14. The free depending end 53 of the outer wall 52 nests in the ledge 216 of the securing portion of the baffle plate 200. The inner wall 44, being sufficiently shorter than the outer wall 52, nests upon the peripheral flange 226 positioned on the exterior surface of the wall 212 of the baffle plate. A cutout portion enables the inner wall 44 to be in contact with the flange 234 and projection 236 of the socket portion 232 of the baffle plate 200. A second cutout portion enables the outer wall 52 to be in contact with the outer surface of the socket 28 and throat 30 portions of the pan assembly 12.

The inner wall 44 surrounds the fan and stage housing assembly 22. An aperture 26, in the inner wall 44, provides a passage for cleaning air passing out of the fan and stage housing assembly 22 into the main housing assembly cavity 51. The cleaning The motor gasket 230 has a ring shape, surrounds the flange 34 of the water pan assembly 12, and is of a resilient material, preferably rubber. A lip 231 formed on the gasket protrudes into the water pan assembly 12 for further sealing the fan and stage housing assembly 22 from the water pan assembly 12. Also, a peripheral groove 233 in the motor gasket 230 enables the flange 226 of the baffle plate 200 to nest in the motor gasket 230 sealing the baffle plate 200 from the water pan assembly 12.

Cleaning air enters the pan assembly 12 through the socket 28. The throat portion 30 directs the cleaning air into the liquid 112 in the pan assembly 12. The separator 26, already in rotation, directs the dirt and dust particles into the liquid 122 while drawing the cleaning air into the fan and stage housing assembly 22. The cleaning air is drawn into the fan and stage housing assembly 22, passes through a plurality of fan stages 114, and then passes out of the fan and stage housing assembly 22 through a plurality of apertures 116. The cleaning air then enters the main assembly inner cavity 71, passes through the inner wall opening 46 into the main housing assembly cavity 51. The cleaning air then exits the cavity 51 through a plurality of scallops 48, in the main housing 14, into the ambient air.

The cooling air enters the cap assembly through opening 74 into the inner canister 62 to cool the motor assembly 18. The cooling air exits through the gap 88 into the cap assembly cavity 64. The cooling air then exits the cap assembly 16 through a plurality of slits 90 into the ambient air. Thus, the cooling air is separated from the cleaning air in the present invention throughout operation of the vacuum cleaner 10.

While it will be apparent that the preferred embodiments as illustrated herein are well calculated to fill the objects of the above stated, it will be appreciated that the present invention is susceptible to modification and variation without changing from the scope and spirit of the present invention.

What is claimed is:

1. A liquid bath vacuum cleaner comprising a pan assembly adapted to contain a liquid bath including inlet means for enabling ingress of cleaning air into said vacuum cleaner and having an outer wall and a wall extending radially inwardly from said outer wall forming an opening at the top of the pan assembly, a baffle means operably associated with said outer wall and said radial wall of said pan assembly for reducing vacuum noise, a main housing operably associated with said baffle means, said baffle means operably positioned between said pan assembly and said main housing, said main housing including a main housing cavity including outlet means for enabling egress of cleaning air from said main housing cavity and said vacuum cleaner, a cap assembly operable associated with said main housing, said cap assembly including a cap assembly cavity, an inner canister positioned within said cap assembly including a motor, a motor assembly mounted within said inner canister, means for drawing cooling air into said cap assembly associated with said motor, means for enabling cooling air to egress from said inner canister into said cap assembly cavity, means for enabling cooling air to egress from said cap assembly cavity and said vacuum cleaner, means operably associated with said main housing assembly for dividing said main housing assembly from said cap assembly, said dividing means including an opening, means operably associated with said dividing means for separating said main housing cavity from said cap assembly cavity, said separating means including a support ring having an opening associated with and secured to said dividing means at said dividing means opening, and a fan housing assembly, including a fan, positioned within said main housing cavity and associated with and secured to said support ring at said support ring opening, means for establishing a seal between said fan housing assembly and said radially inwardly extending wall and a separator for drawing cleaning air into said pan assembly and for separating said cleaning air from liquid droplets.

2. A liquid bath vacuum cleaner as in claim 1 wherein a shaft depends from the motor, said shaft rotating said fan and said separator.

3. A liquid bath vacuum cleaner as in claim 2 wherein a positive pressure seal is formed around said separator for sealing said fan housing assembly from liquid and liquid vapors contained in said fan assembly.

4. A liquid bath vacuum cleaner as in claim 3 wherein a sealed bearing means is mounted on said shaft within said fan housing adjacent to said motor for sealing said fan housing from cooling air disposed in said inner canister.

5. A liquid bath vacuum cleaner comprising a pan assembly adapted to contain a liquid bath including an inlet for enabling ingress of cleaning air into said vacuum cleaner and having an outer wall and a wall extending ratially inwardly from said outer wall forming an opening at the top of the pan assembly, a baffle means removably connected to said outer wall and said radial wall of said pan assembly for reducing vacuum noise, a main housing assembly removably connected to said baffle means, said main housing assembly including a main housing cavity, said main housing assembly having an outer wall, a concentric wall having an opening, a wall extending radially inwardly from said outer wall having a radially inwardly flange including an opening, and an outlet associated with said outer wall for enabling egress of cleaning air from said main housing cavity and said vacuum cleaner, a cap assembly operably associated with said main housing, said cap assembly including a cap assembly cavity, an inner canister positioned within said cap assembly cavity, a motor assembly, including a motor, mounted within said inner canister, means for drawing cooling air into said cap assembly associated with said motor, means for enabling cooling air to egress from said inner canister into said cap assembly cavity, means for enabling cooling air to egress from said cap assembly cavity and said vacuum cleaner, means positioned at said opening of said radially inward flange of said main housing assembly for separating said main housing assembly cavity from said cap assembly cavity, said separating means including a support ring associated with and secured to said radially inward flange of said main housing assembly, and a fan housing assembly, including a fan, positioned within said main housing cavity and associated with and secured to said support ring at said radial flange opening, said concentric wall extending between said support ring and said radially inwardly wall, means for establishing a seal between said fan housing assembly and said pan assembly radially inwardly extending wall and a separator positioned within said pan assembly for drawing cleaning air into said pan assembly and separating said cleaning air from liquid droplets.

6. The liquid bath vacuum cleaner as in claim 5 wherein a shaft depends from the motor, said shaft rotating said fan and said separator.

7. The liquid bath vacuum cleaner as in claim 6 wherein a positive pressure seal is formed around said separator for sealing said fan housing assembly to constrain water vapors from entering said canister.

8. The liquid bath vacuum cleaner as in claim 7 wherein a sealed bearing means is mounted on said shaft within said fan housing assembly adjacent to said motor for sealing said fan housing assembly from said cooling air and said inner canister.

* * * * *